Oct. 8, 1968 R. D. REIS 3,404,946
HEAT-TREATING APPARATUS AND CONTROL THEREFOR
Filed Oct. 28, 1963
2 Sheets-Sheet 1
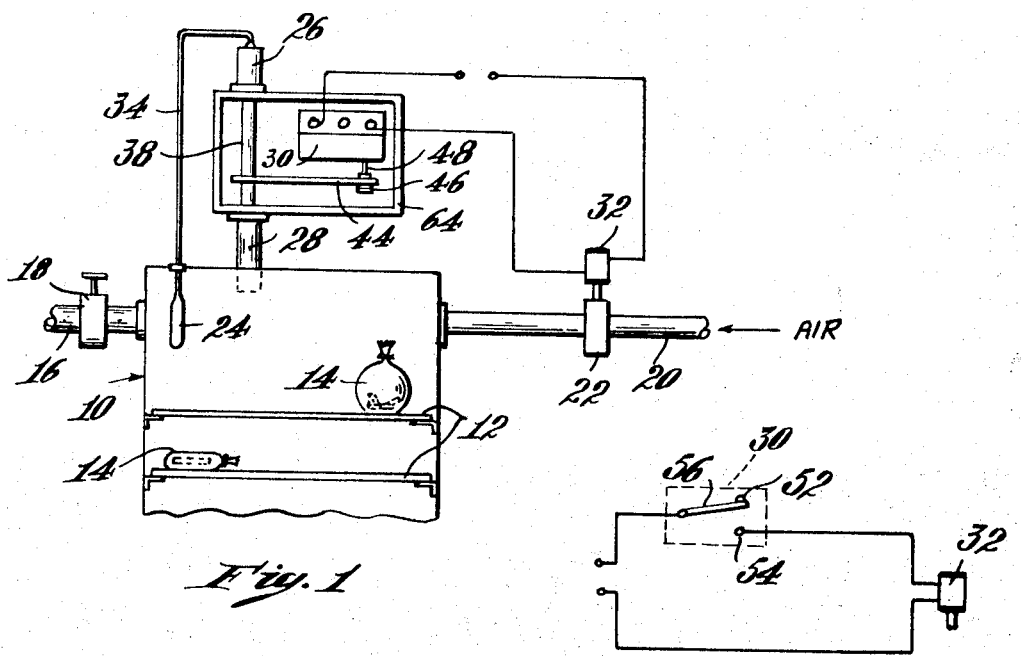
Fig. 1
Fig. 2
VAPOR PRESSURE ETHYL ALCOHOL
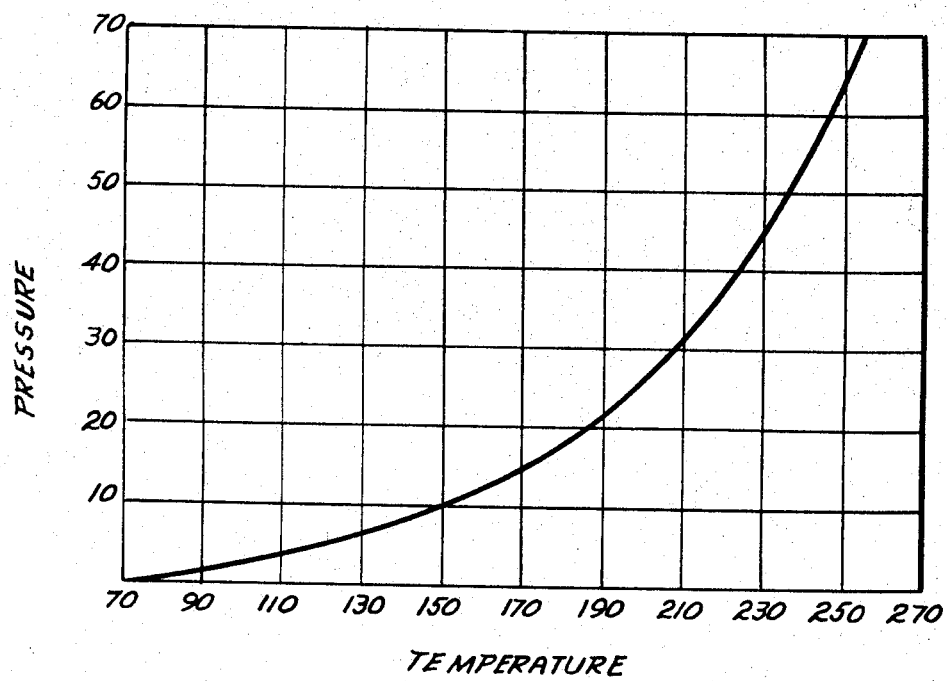
Fig. 3

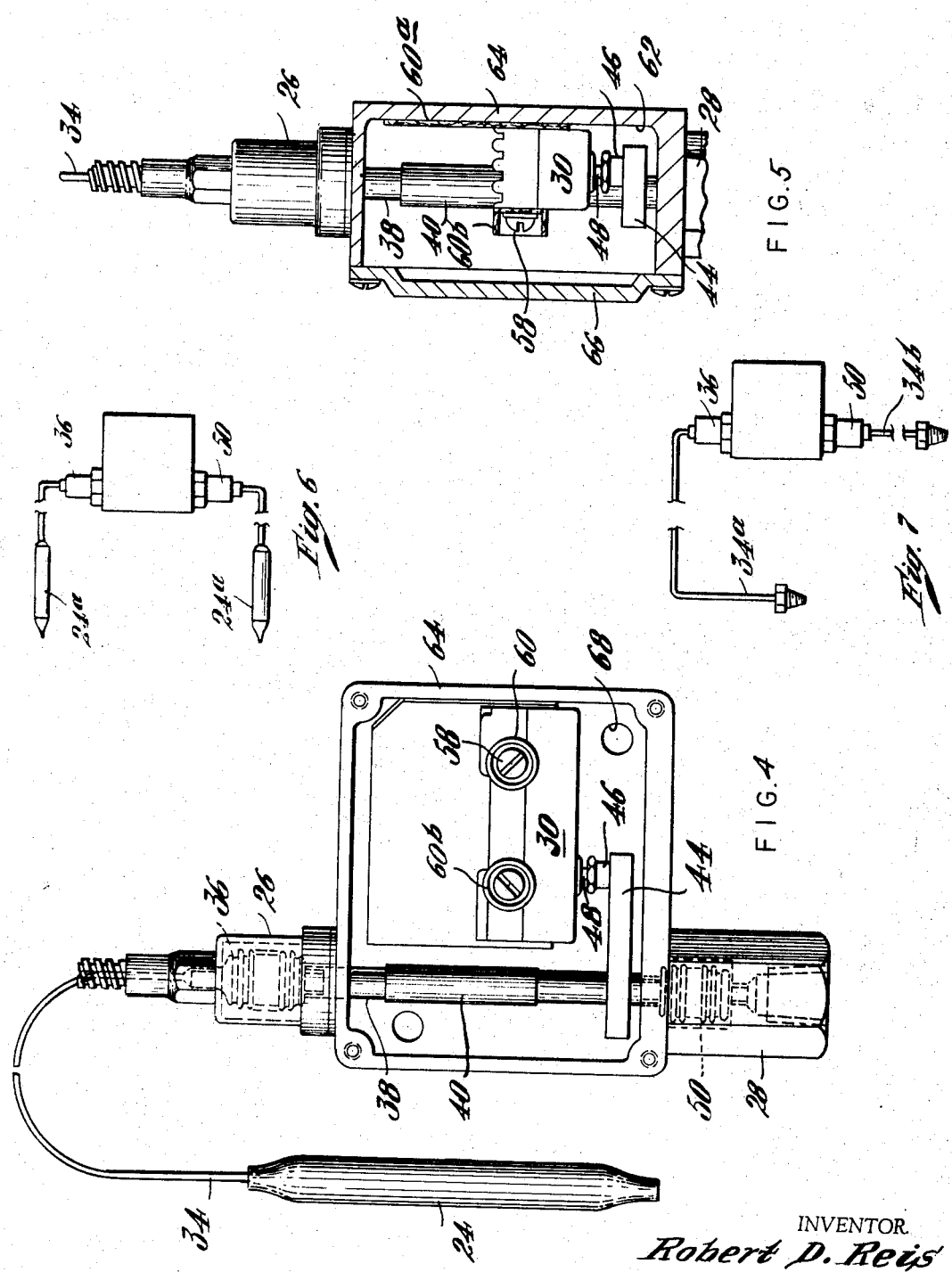

United States Patent Office 3,404,946
Patented Oct. 8, 1968

3,404,946
HEAT-TREATING APPARATUS AND CONTROL
THEREFOR
Robert D. Reis, Hingham, Mass., assignor to United
Electric Controls Company, Watertown, Mass., a corporation of Massachusetts
Filed Oct. 28, 1963, Ser. No. 319,183
1 Claim. (Cl. 21—94)

ABSTRACT OF THE DISCLOSURE

A device comprising two pressure-operable motors connected in opposite relation to each other and to a switch-actuating arm to operate a switch. One motor is exposed to the pressure within a sterilizing chamber wherein there are supported receptacles for treatment containing a sterilizing fluid which is volatile, and the other is connected to a bulb situated in the sterilizing chamber containing a volatile fluid corresponding to that in the receptacle or having a known ratio of expansion relative thereto, so that expansion of the fluid in the receptacle and the bulb takes place simultaneously. A valve is operable by the switch to supply pressure to the chamber in excess of the pressure developed by the expansion of the volatile fluid.

---

It is customary in sterilizing medical instruments to place them in thin-walled polyethylene receptacles together with an antiseptic fluid such as ethyl alcohol and then to place the receptacles in a sterilizing chamber into which steam is injected. As the receptacles are heated, the vapor pressure of the alcohol increases at a faster rate than the increase in air pressure in the chamber and when it exceeds the air pressure will rupture the receptacles. The principal object of this invention is to avoid bursting the receptacles due to such higher rate of expansion of antiseptic fluid within them by maintaining a positive pressure differential between the ambient pressure within the sterilizing chamber and the vapor pressure within the receptacles.

As herein illustrated, the apparatus for heat-treating comprises a rigid sterilizing chamber within which a body to be heat-treated is placed, means for heating the chamber, means operative to supply pressure fluid to the chamber, means responsive to the ambient pressure within the chamber as the temperature rises to maintain the last-named means inoperative so long as there is a positive pressure differential of predetremined amount between the ambinet pressure within the chamber and the pressure developed within the body, and means responsive to a rise in pressure within the body such that the pressure differential becomes less than the predetermined amount to effect operation of the second means. The body may be any article within which a vapor pressure is developed by heating which would, if it exceeded the ambient pressure, burst the body. For use with sterilizing apparatus, the body takes the form of a hollow thin-walled polyethylene receptacle of rigid or plastic character. The means for supplying pressure fluid to the chamber is a valve or pump and the means for effecting operation of the valve or pump to admit pressure fluid to the chamber is a reversible motor operable, by a pressure differential of a predetermined amount, to initiate operation of the valve or pump. Differential pressure is established by connecting the opposite sides of the reversible motor to the ambient pressure within the chamber and to a pressure corresponding to that developed in the body. A sensing tube, containing a fluid corresponding in vapor pressure to that of the fluid in the body, situated in the chamber so as to be heated at the same rate as the body, affords the component of pressure opposed to the ambinet pressure.

As illustrated, the reversible motor includes a switch having an actuating pin, a rod supported in parallel relation to the actuating pin, an arm fixed to the rod and movable therewith, and two bellows, one connected to each end of the rod, expandable by pressure and operable by a difference in pressure between the two. The switch, in turn, energizes a solenoid connected to the valve.

The invention will now be described in greater detail with reference to the accompanying drawings wherein:

FIG. 1 is a diagrammatic layout of a sterilizing chamber showing the controls;

FIG. 2 is a diagram of the electric circuit for the solenoid-operated valve which controls the admission of pressure fluid to the sterilizing chamber;

FIG. 3 is a graph of the vapor pressure of ethyl alcohol;

FIG. 4 is an elevation of the snap-action switch and motor actuators therefor, shown to somewhat larger scale;

FIG. 5 is an elevation taken on the line 5—5 of FIG. 4;

FIG. 6 is a view corresponding to FIG. 4, showing two sensing devices in the form of bulbs containing volatile fluid for use in producing actuation of the switch by a temperature differential; and FIG. 7 is a view corresponding to FIG. 6, in which conductors from the bellows are provided to permit connection to diffrent parts of a pressure system when it is desirable to use the device for measuring pressure differential in the system.

Referring to the drawings (FIG. 1), there is shown diagrammatically a rigid sterilizing chamber 10 comprised of stainless steel, or other suitable material, which will withstand relatively high temperature and pressure, within which there are supports 12 for receptacles 14 adapted to hold articles which are to be sterilized together with an antiseptic fluid. According to the preferred practice, the receptacles are in the form of thin-walled bags or capsules of elastically stretchable material such as polyethylene, rubber, and the like, and the antiseptic fluid is an alcohol such as ethyl alcohol. Rigid receptacles of plastic, glass, porcelain, or the like, may be used if desired.

The sterilizing chamber 10 is provided with a steam pipe 16 containing a valve 18, by means of which steam pressure is supplied to the chamber at a sufficiently high temperature to effect sterilization. Other heating means could, of course, be substituted for the steam heating. A temperature in the order of 248° F. is necessary to insure sterilization hence provision is made for raising the temperature of the chamber from room temperature at about 77° F. up to about 270° F.

As the steam is admitted to the sterilizing chamber the antiseptic fluid vaporizes in the receptacles thus increasing the pressure therein so that, unless some means is provided for increasing the pressure within the sterilizing chamber externally of the receptacles to maintain the pressure outside the receptacles greater than the pressure within them, they will be shattered or ruptured.

The purpose of this invention is to provide an apparatus automatically operable to prevent the receptacles, whether rigid or expandable, from bursting by maintaining the ambient pressure, that is, the pressure within the sterilizing chamber slightly greater than the vapor pressure of the alcohol within the receptacles throughout the rise in sterilizing temperature, that is, from approximately 77° F. up to approximately 248° F.

In accordance with the invention, rupturing or bursting of the receptacles 14 is prevented by supplying air under pressure to the sterilizing chamber through a conductor 20 (FIG. 1), when the pressure within the receptacles rises to within about three (3) pounds of the pressure outside the receptacles so as to maintain a positive pressure differential within the sterilizing chamber of about three (3)

pounds per square inch greater than the vapor pressure inside of the receptacles 14. A valve 22 is provided in the conductor 20 for admitting air pressure from a suitable source.

The rise in vapor pressure of the ethyl alcohol as the temperature is increased from 70° F. to 270° F. is shown in the graph (FIG. 3) wherein the pressure is in pounds per square inch and the temperature in degrees Fahrenheit.

The pressure differential is automatically maintained by a control comprised of a sensing device 24, a pair of opposed motors 26 and 28, a snap-action microswitch 30, and a solenoid 32. The motors 26 and 28 contain bellows 36 and 50 connected, respectively, to the opposite ends of a rod 38 covered with insulation 40 (FIGS. 4 and 5). The bellows 50 of the motor 28 is in direct communication with the interior of the chamber, or may be connected to it by a capillary tube. The sensing device 24 is in the form of a tube or bulb containing a fluid having a vapor pressure corresponding to the fluid placed in the receptacles 14 and is connected by a capillary tube 34 to the bellows 36 of the motor 26.

A lever 44 is fastened at one end of the rod 38 and has at its distal end an adjustable screw 46 disposed opposite a switch pin 48 protruding from the snap-action switch 30. The snap-action switch is of the kind shown in the pending application of John A. Denner, Ser. No. 115,250, filed June 6, 1961, now Pat. No. 3,097,273, wherein transfer and retransfer is effected by holding the switch pin depressed and releasing it. The snap-action switch 30 is electrically connected to the solenoid 32 so that when the bellows 36 of the motor 26 expands, the switch 30 is operated to energize the solenoid 32 thereby to open the valve 22 and admit air under pressure to the chamber 10.

The valve 22 is normally held closed by the pressure within the chamber operating on the bellows 50, however, when the pressure within the sensing tube 24 rises to within about three (3) pounds of the pressure in the chamber, it expands the bellows 36 in the motor 26 so as to shift the rod 38 in opposition to the motor 28. Displacement of the rod 38 toward the motor displaces the lever 44 thereby actuating the switch 30 which, in turn, energizes the solenoid 32 whereupon the latter opens the valve 22 so as to admit pressure to the chamber 10. The bellows of the two motors are designed so that the effective areas exposed to the opposed pressures provide for shifting of the rod 38 and hence transfer of the switch when the pressure differential between the chamber and the sensing device is three (3) pounds per square inch or less. The magnitude of the pressure differential may be modified without departing from the scope of the invention to suit the particular conditions involved in the heat-treating operation.

For convenience, the components of the control are assembled as a unit. As shown in FIGS. 4 and 5, the snap-action switch 30 is mounted by means of screws 58 and suitable insulation 60a and 60b on the back wall 62 of a rigid box 64 having a removable cover 66. The back wall 62 contains two or more holes 68 by means of which the box may be secured to a wall or other support on or adjacent the chamber 10. The motors 26 and 28 are secured to the top and bottom walls of the box and support the rod 38 and lever 44 within the box. The box, including the switch, switch-actuating means and motors, constitutes a compact unit easy to manufacture and install.

The circuit containing the switch 30 and the solenoid 32 (FIG. 2), shows the switch contacts 52, 54 and 56 with the movable contact 56 in the open position, that is, with the solenoid de-energized and the air valve closed. The contact 56 is actuated by the pin 48. Movement of the movable contact 56 into engagement with the fixed contact 54 energizes the solenoid and opens the air pressure valve 22.

The air may be supplied to the conductor 20 from any suitable source of air pressure. If desired, the valve 22 may be replaced by a motor driven pump.

While illustrated herein for the specific purpose of controlling the expansion of flexible receptacles containing a fluid expandable at a greater rate than the pressure developed in the heating chamber, it is within the scope of the invention to employ the control for use with any heat-treating apparatus wherein it is desirable to maintain the ambient pressure, that is, the pressure within the heat-treating chamber higher than that developed within the article being treated throughout the range of temperature involved in the heat-treating process.

It should be understood that the present disclosure is for the purpose of illustration only and that this invention includes all modifications and equivalents which fall within the scope of the appended claims.

I claim:
1. Apparatus for maintaining the ambient pressure within a rigid sterilizing chamber higher than the vapor pressure developed within the article being subjected to sterilization within the chamber, comprising a chamber, a steam pipe connected to the chamber through which steam is supplied to the chamber to effect sterilization, an air pipe connected to the chamber through which air under pressure is supplied to the chamber, a valve in the air pipe for controlling the flow of air under pressure through the air pipe to the chamber, a solenoid connected to the valve operable to open and close the valve, and control means situated exteriorly of the chamber for effecting energization of the solenoid comprising a switch electrically connected to the solenoid, a switch actuator operably associated with the switch to effect its operation, and two pressure-operable motors mounted to act upon the switch actuator in opposite directions in opposition to each other, each motor comprising an expandable bellows having a fixed end and a movable end, the movable ends of the bellows being fixed to the switch actuator to effect movement thereof, the fixed end of one bellows being exposed through a hole in the wall of the chamber to the pressure therein and the fixed end of the other bellows being connected to one end of a conductor, and a bulb in the chamber containing a volatile fluid to which the other end of the conductor is connected, said volatile fluid being expandable in proportion to the expansion of the fluid within the article being subjected to sterilization and being operable, by increasing the pressure in the sterilizing chamber, to maintain a pressure differential in the sterilizing chamber in which the pressure in the chamber is always higher than the pressure in the article being subjected to sterilization.

References Cited
UNITED STATES PATENTS

| 2,472,970 | 6/1949 | Hanna | 21—94 |
| 2,849,577 | 8/1958 | Pfeiffer | 200—83.31 |
| 2,868,616 | 1/1959 | Poitras | 21—94 |

JAMES H. TAYMAN, Jr., *Primary Examiner.*